United States Patent
Shin et al.

(10) Patent No.: US 10,133,279 B2
(45) Date of Patent: Nov. 20, 2018

(54) APPARATUS OF UPDATING KEY FRAME OF MOBILE ROBOT AND METHOD THEREOF

(71) Applicant: YUJIN ROBOT CO., LTD., Seoul (KR)

(72) Inventors: Kyung Chul Shin, Seoul (KR); Seong Ju Park, Gunpo-si (KR); Jae Young Lee, Gunpo-si (KR)

(73) Assignee: Yujin Robot Co., Ltd., Incheon (KR)

( * ) Notice: Subject to any disclaimer, the term of this patent is extended or adjusted under 35 U.S.C. 154(b) by 18 days.

(21) Appl. No.: 15/382,596

(22) Filed: Dec. 16, 2016

(65) Prior Publication Data

US 2017/0153647 A1    Jun. 1, 2017

Related U.S. Application Data

(63) Continuation of application No. PCT/KR2015/006153, filed on Jun. 17, 2015.

(30) Foreign Application Priority Data

Jun. 17, 2014 (KR) ........................ 10-2014-0073708

(51) Int. Cl.
*G05D 1/02* (2006.01)
*B25J 9/16* (2006.01)
(Continued)

(52) U.S. Cl.
CPC .............. *G05D 1/0253* (2013.01); *B25J 9/16* (2013.01); *B25J 9/1697* (2013.01); *B25J 13/08* (2013.01);
(Continued)

(58) Field of Classification Search
CPC .. G05D 1/0253; G05D 1/0274; G05D 1/0251; B25J 9/1697; B25J 13/08
See application file for complete search history.

(56) References Cited

U.S. PATENT DOCUMENTS

| 7,110,602 | B2 | 9/2006 | Krause | |
| 2015/0206023 | A1* | 7/2015 | Kochi | .................... G01B 11/00 382/199 |

FOREIGN PATENT DOCUMENTS

| KR | 10-2003-0095492 A1 | 12/2003 |
| KR | 10-0834577 A1 | 6/2008 |

(Continued)

OTHER PUBLICATIONS

Ethan Eade and Tom Drummond, Edge landmarks in monocular SLAM, Image and Vision Computing, vol. 27, Issue 5, pp. 588-596, Apr. 2, 2009.

(Continued)

*Primary Examiner* — Michael D Lang
(74) *Attorney, Agent, or Firm* — Jongkook Park

(57) ABSTRACT

Disclosed are an apparatus and a method of updating a key frame of a mobile robot. An apparatus for updating a key frame of a mobile robot includes a key frame initializing unit which initializes seeds which constitute a key frame in a first position of the mobile robot and a key frame updating unit which projects seeds in the initialized key frame onto a first image photographed in the first position to obtain a coordinate according to each of the seeds and projects the seeds with the coordinates onto a second image photographed in a second position in accordance with movement of a mobile robot to update the seeds of the key frame as a projected result.

28 Claims, 11 Drawing Sheets

(51) Int. Cl.
  *B25J 13/08* (2006.01)
  *G06K 9/00* (2006.01)
  *G06K 9/46* (2006.01)
  *G06T 7/73* (2017.01)
  *G06T 7/13* (2017.01)
  *H04N 13/239* (2018.01)

(52) U.S. Cl.
  CPC ......... *G05D 1/0251* (2013.01); *G05D 1/0272* (2013.01); *G05D 1/0274* (2013.01); *G06K 9/00664* (2013.01); *G06K 9/4604* (2013.01); *G06K 9/4647* (2013.01); *G06T 7/13* (2017.01); *G06T 7/74* (2017.01); *H04N 13/239* (2018.05); *G05D 1/027* (2013.01); *G06K 9/00201* (2013.01); *G06T 2207/10021* (2013.01); *G06T 2207/20021* (2013.01); *G06T 2207/30244* (2013.01); *G06T 2207/30252* (2013.01); *Y10S 901/01* (2013.01)

(56) References Cited

FOREIGN PATENT DOCUMENTS

| KR | 10-2010-0081588 A1 | 7/2010 |
| KR | 10-2010-0119442 A1 | 11/2010 |
| KR | 10-2011-0011424 A1 | 2/2011 |
| KR | 10-2011-0047797 A1 | 5/2011 |
| KR | 10-2011-0097344 A1 | 8/2011 |
| KR | 10-2012-0070291 A1 | 6/2012 |
| KR | 10-2013-004674 A1 | 5/2013 |

OTHER PUBLICATIONS

John Canny, A Computational Approach to Edge Detection, IEEE Transactions on Pattern Analysis and Machine intelligence, vol. PAMI-8, No. 6 pp. 679-698, Nov. 1986.
S. Benhimane and E. Malts, Homography-based 2D Visual Tracking and Servoing, International Journal of Robotics Research archive vol. 26 Issue 7 pp. 661-676, Jul. 2007.
Michael Calonder, Vincent Lepetit, Christoph Strecha, and Pascal Fua, BRIEF: Binary Robust Independent Elementary Features, vol. 6314 of the series Lecture Notes in Computer Science pp. 778-792, 11th European Conference on Computer Vision, Heraklion, Crete, Greece, Sep. 5-11, 2010.
Christoph Strecha, Vincent Lepetit, Tomasz Trzcinski, Michael Calonder, Mustafa Özuysal and Pascal Fua, BRIEF: Computing a local binary descriptor very fast, vol. 34 Issue No. 07, Jul. 2012.
Wooyeon Jeong and Kyoung Mu Lee, CV-SLAM: a new ceiling vision-based SLAM technique, IEEE International Conference on Intelligent Robots and Systems, Aug. 2-6, 2005.
Georg Klein and David Murray, Parallel Tracking and Mapping for Small AR Workspaces, IEEE and ACM International Symposium on Mixed and Augmented Reality, Nov. 13-16, 2007.
Woo Yeon Jeong and Kyoung Mu Lee, Visual SLAM with Line and Corner Features, Proceedings of the 2006 IEE/RSJ International Conference on Intelligent Robots and Systems Beijing China pp. 2570-2575, Oct. 9-15, 2006.

* cited by examiner

[FIG. 1]
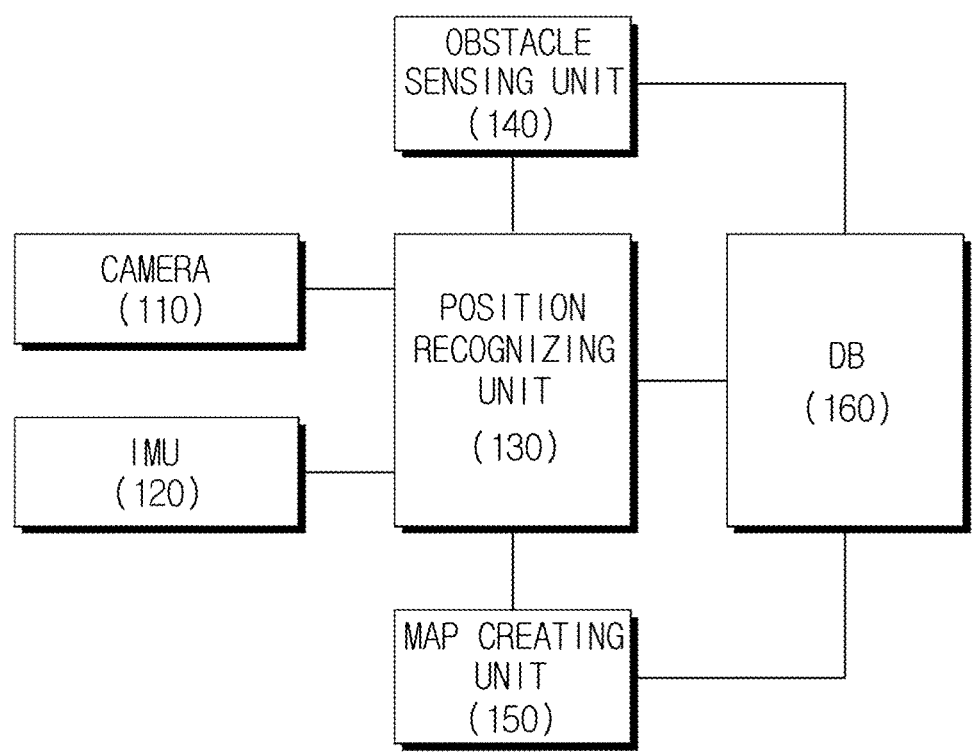

[FIG. 2]
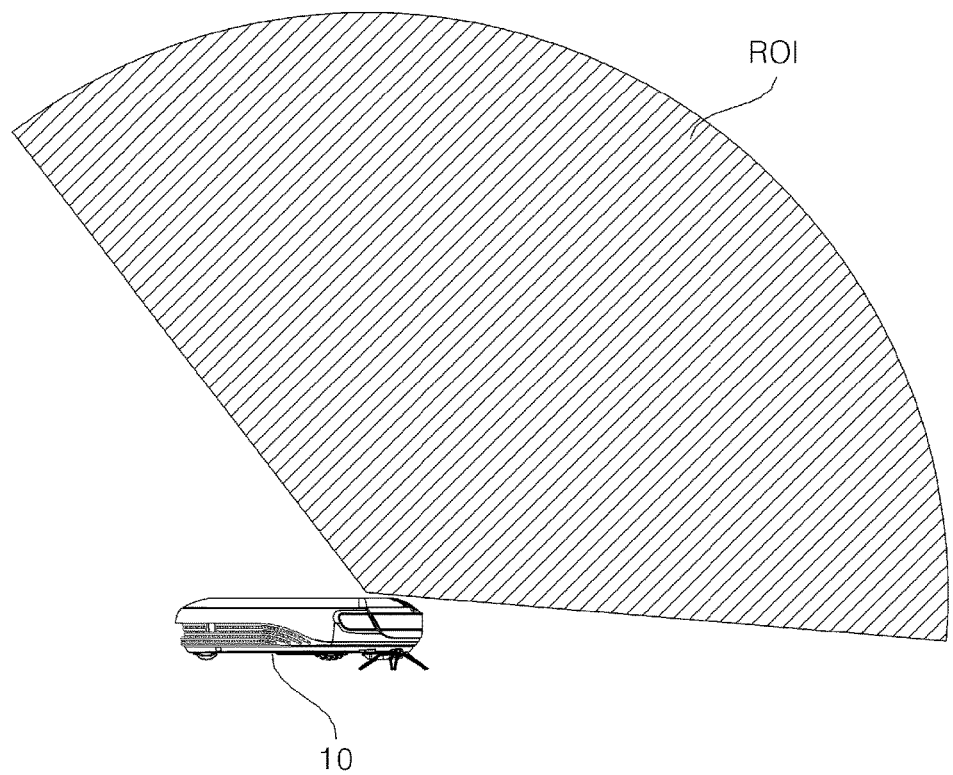

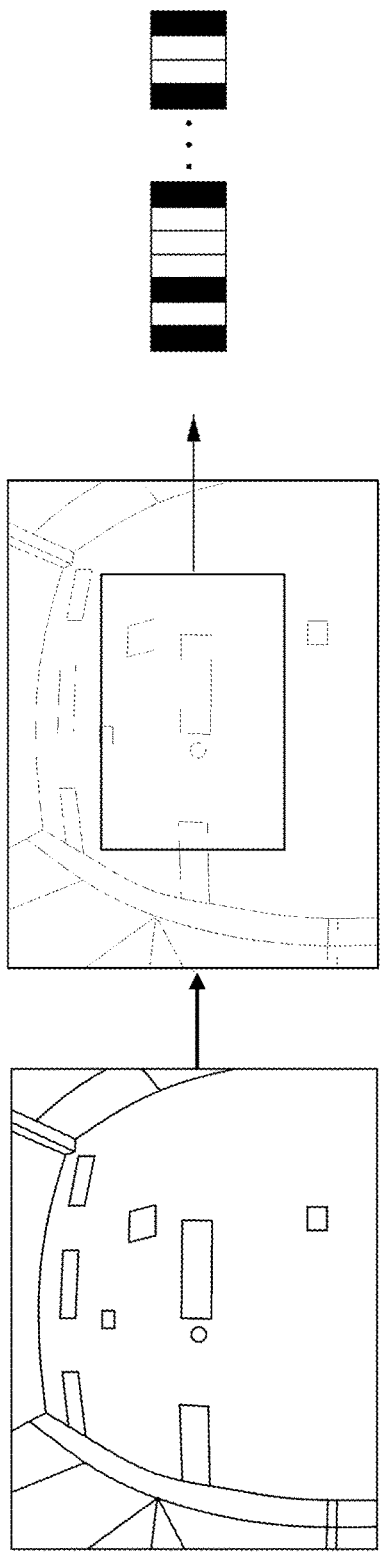

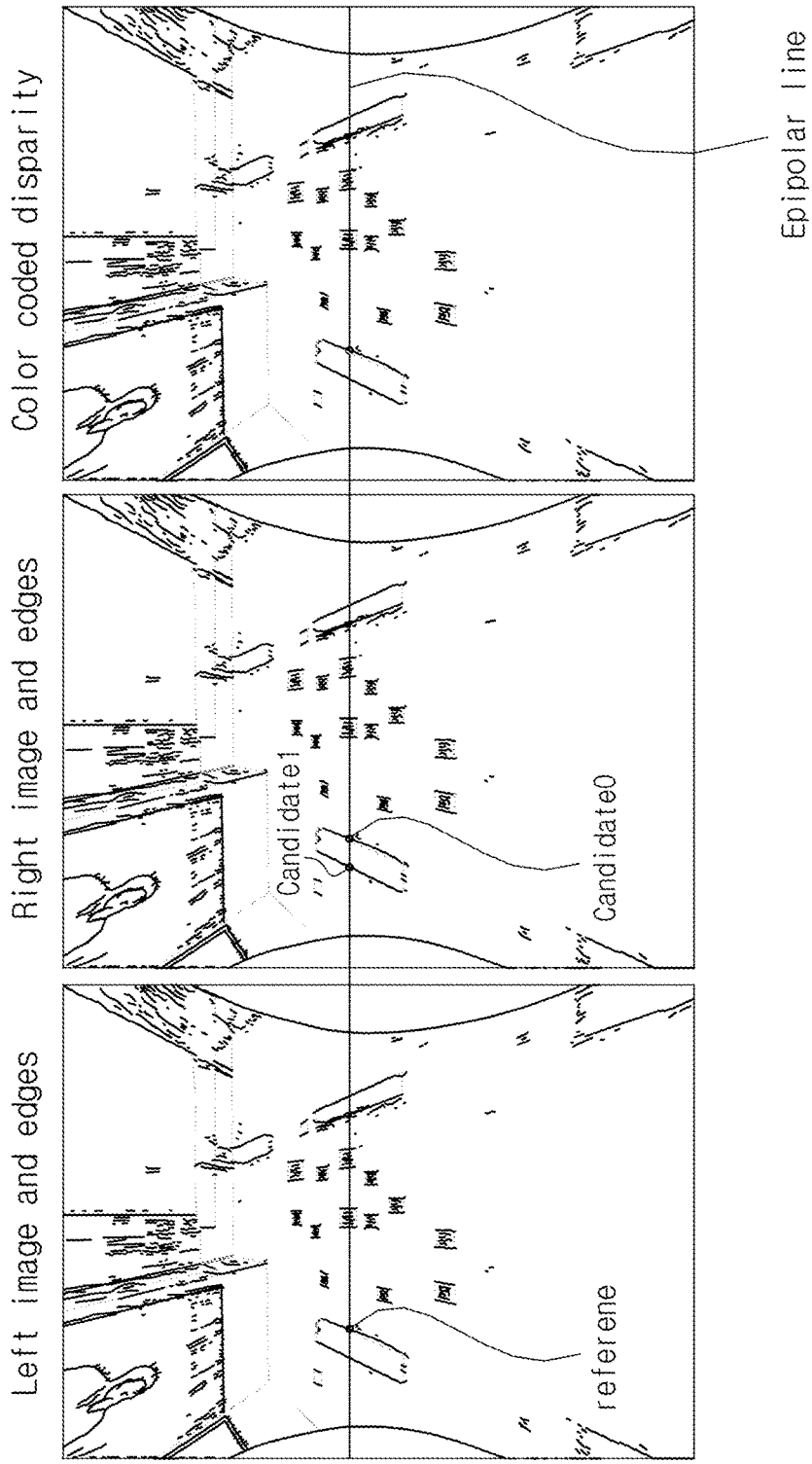

[FIG. 5]
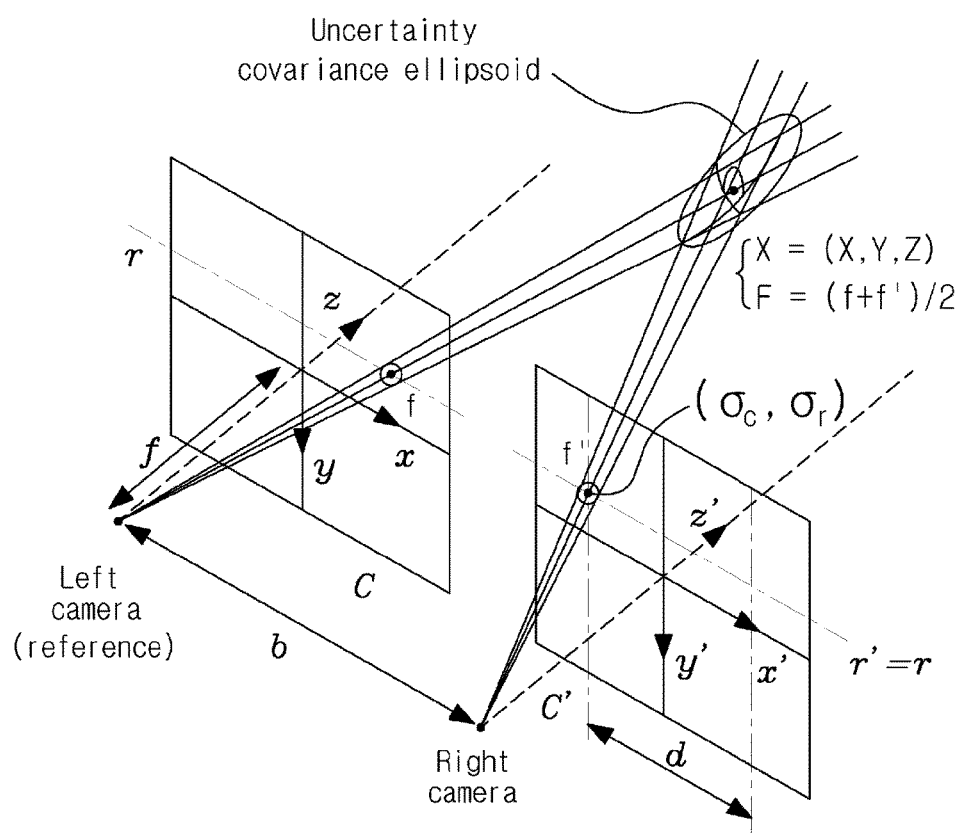

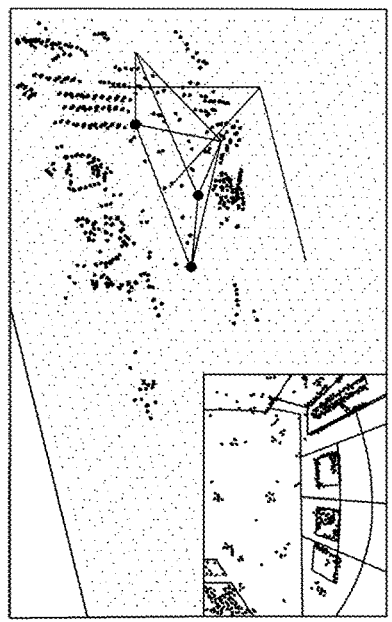
[FIG. 6D]
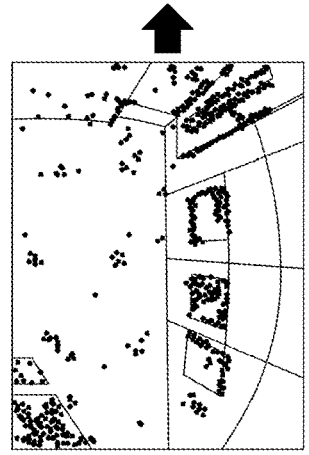
[FIG. 6C]
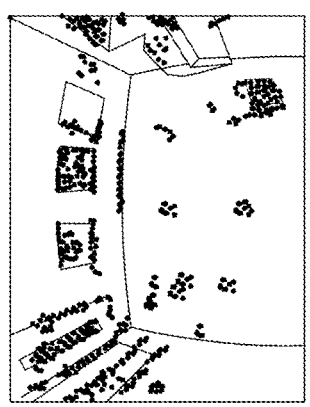
[FIG. 6A]
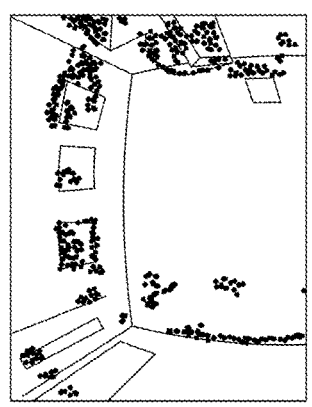
[FIG. 6B]

[FIG. 7]
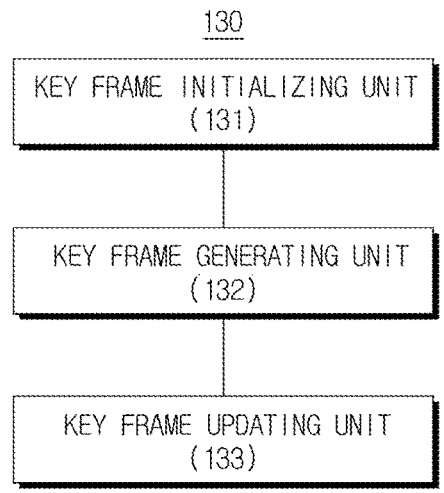
[FIG. 8]
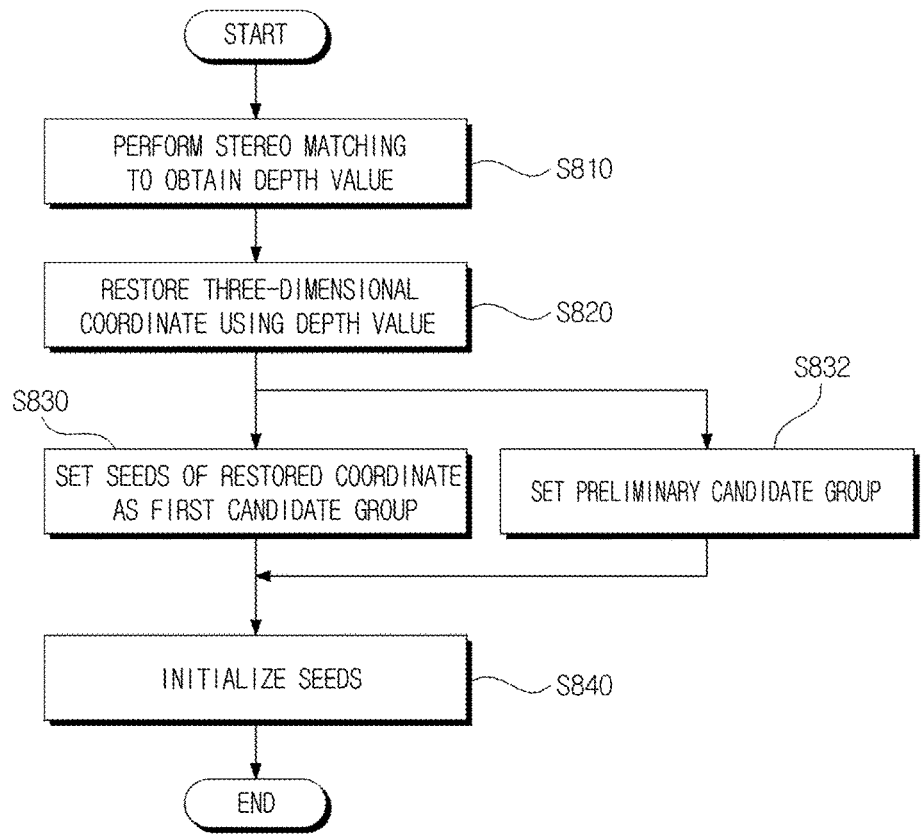

[FIG. 9]
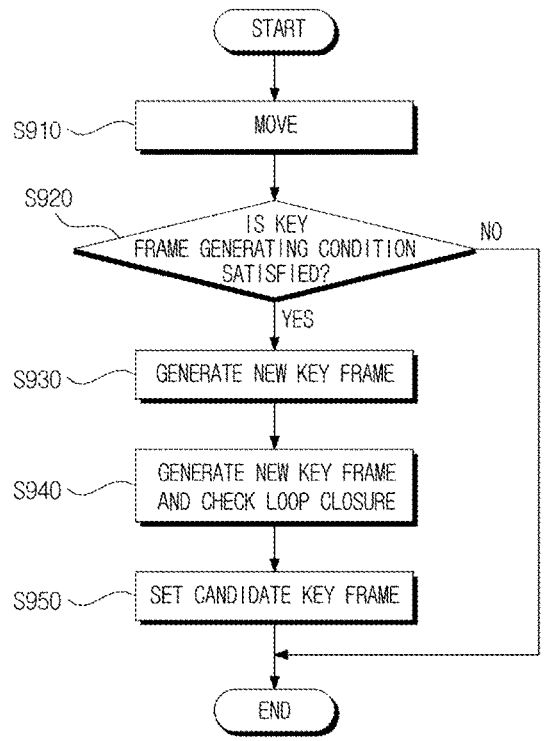
[FIG. 10]
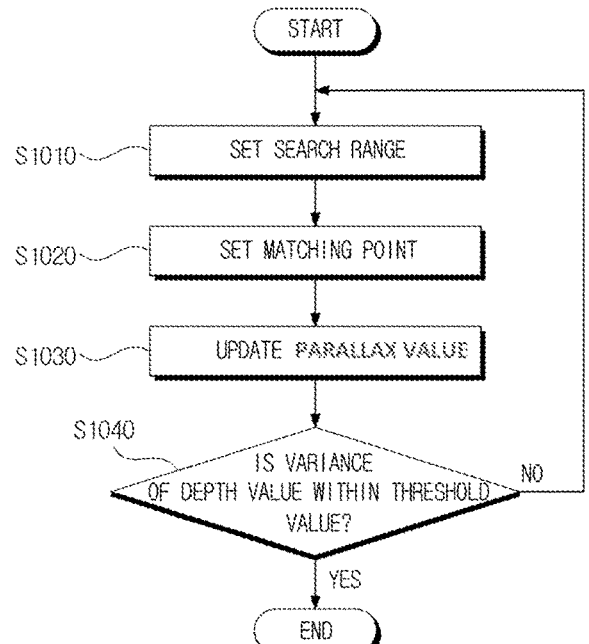

[FIG. 11]
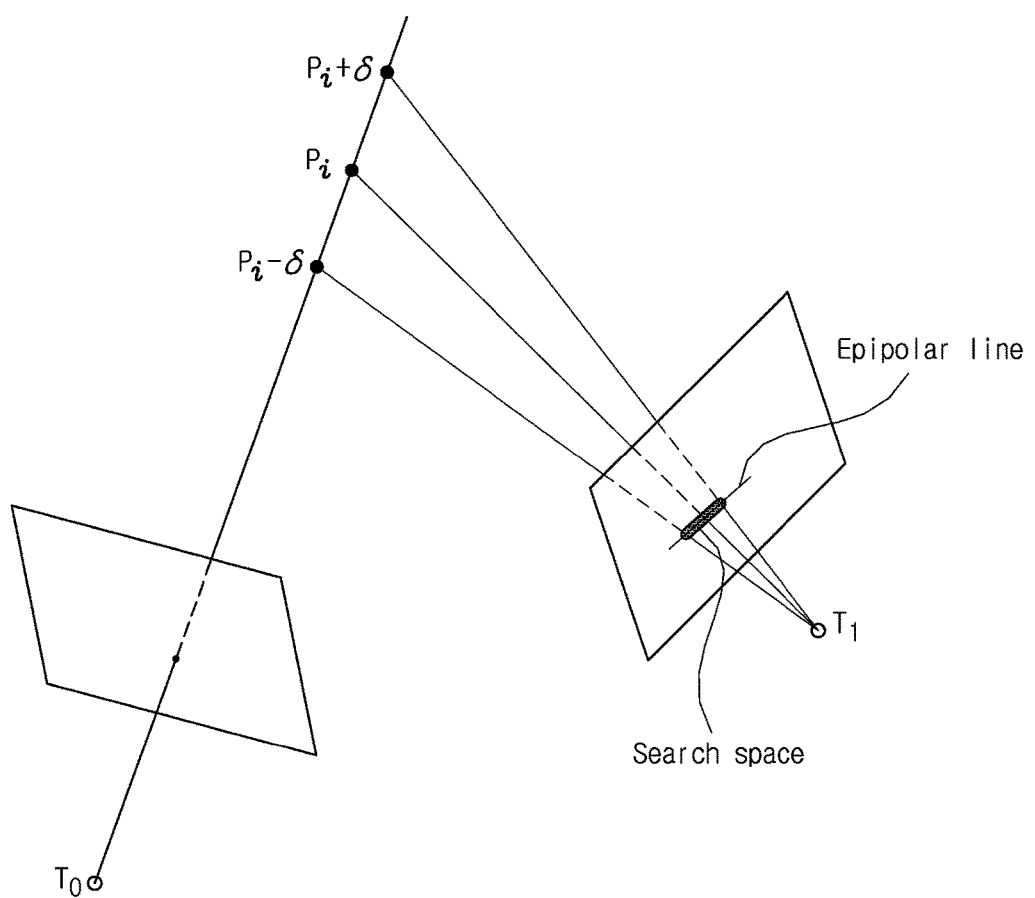

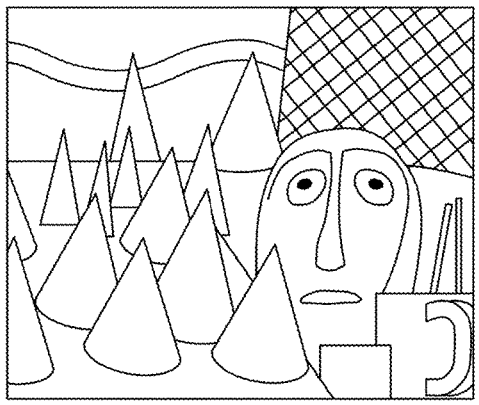
[FIG. 12A]
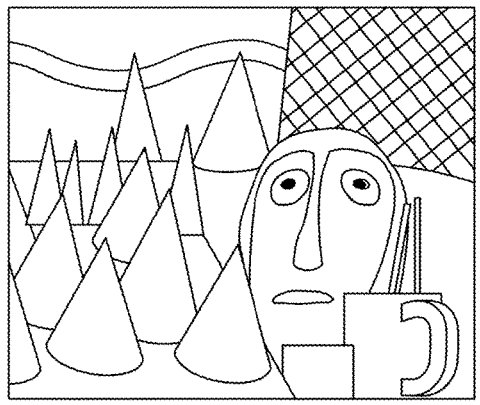
[FIG. 12B]
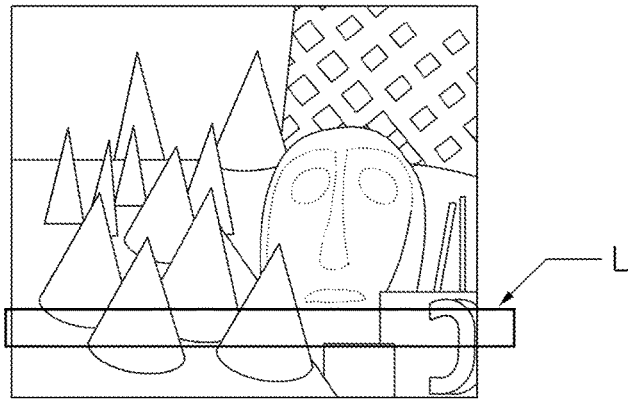
[FIG. 12C]

[FIG. 13]
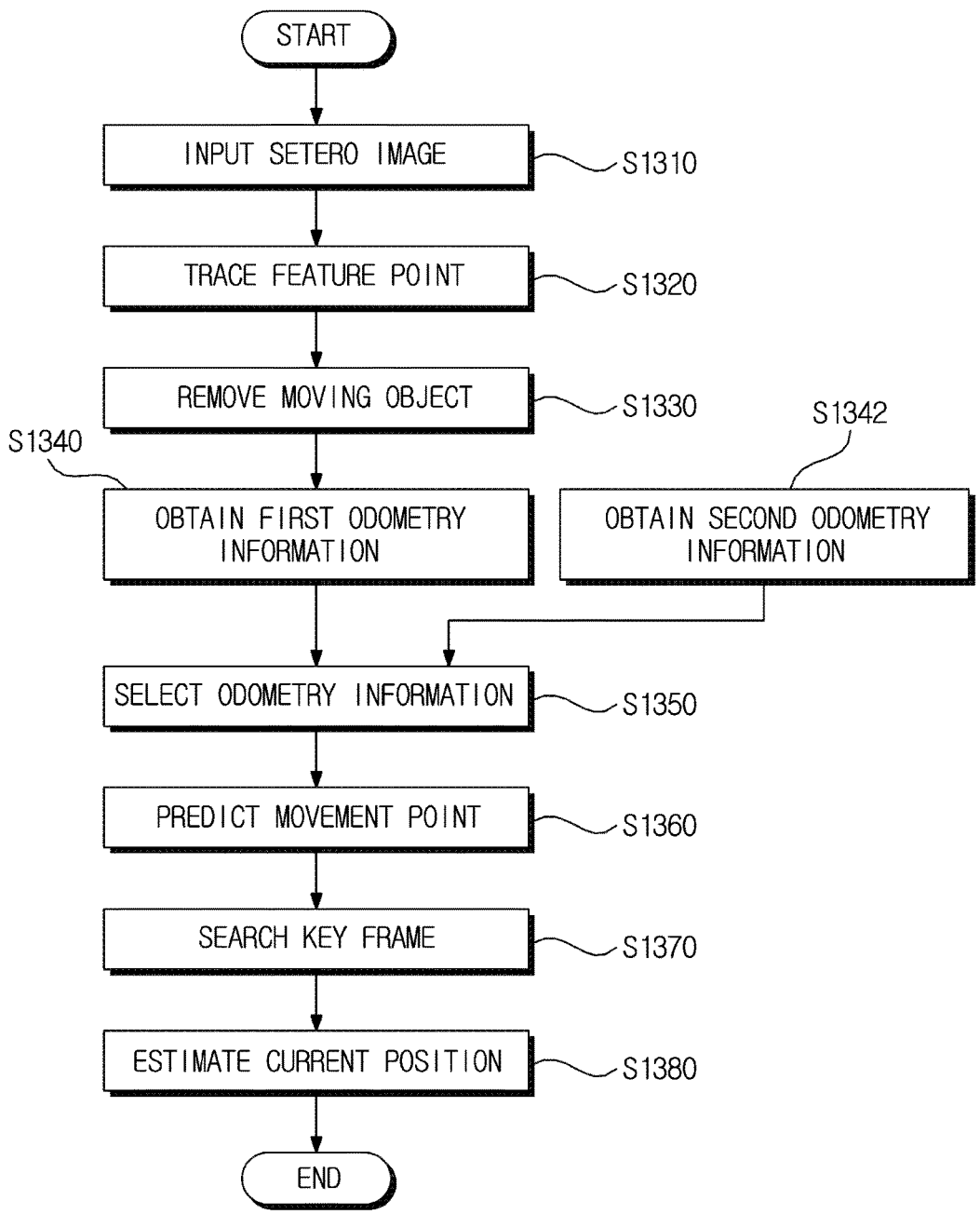

APPARATUS OF UPDATING KEY FRAME OF MOBILE ROBOT AND METHOD THEREOF

CROSS-REFERENCE TO RELATED APPLICATIONS

This application is a continuation of International Application No. PCT/KR2015/006153, filed on Jun. 17, 2015, which claims priority to and the benefit of Korean Patent Application No 10-2014-0073708 filed in the Korean Intellectual Property Office on Jun. 17, 2014, both of which are hereby incorporated by reference in their entireties.

TECHNICAL FIELD

The present invention relates to a SLAM technique of a mobile robot, and more particularly, to an apparatus for updating the key frames of a mobile robot using a stereo camera, and a method thereof.

BACKGROUND

Recently, following the development of robot technology, mobile robots, which set the route by themselves and move, have been utilized. In order to allow such mobile robots to effectively determine a position and move in a space, it is required to allow the mobile robot to recognize the position of the robot in the space while generating a map for the space wherein the robot moves.

Mobile robots move by dead reckoning navigation using a gyroscope and an encoder provided in a driving motor, and generate a map by analyzing images taken using a camera provided in the upper portion. In this case, when an error is incurred by the driving information from the gyroscope and the encoder, the image information obtained from the camera is utilized to correct the accumulated error.

However, position-based mobile robots which have been developed until now were developed under the assumption of movement on a two-dimensional plane using a monocular camera or a laser scanner. However, when a monocular camera is used, it is difficult to know the distance to a feature point. Therefore, as the error of the dead reckoning navigation is increased, increasingly many errors may be included in the position recognition results.

Further, since laser scanners are too expensive to be applied to mobile robots, studies for employing a simultaneous localization and mapping (SLAM) technology, which recognizes a space and updates the position using a stereo camera, have been increasing in recent years.

Mobile robots based on SLAM (Simultaneous Localization and Mapping) technology perform the processes of extracting a corner feature point from an image, creating a map by restoring three-dimensional coordinates of the corner feature point, and recognizing a position.

It is very important for mobile robots to recognize a space and recognize their own position in the space. Since mobile robots which do not employ the above-described technique have limited mobility and may provide very limited types of service, mobile robots are being competitively developed.

SUMMARY OF THE INVENTION

The present invention is to provide an apparatus for updating the map of a mobile robot through update of the key frame related to the present position, and a method thereof. This is accomplished by utilizing the key frames of the mobile robot generated during movement to determine the current location of the robot, and utilizing the parallax value of the seeds projected from the previously acquired key frames to update the key frame regarding the current position of the mobile robot, so that the map of the mobile robot may be updated.

The present invention has also been made in an effort to further provide an apparatus of updating the key frames of a mobile robot using an approximated difference of Gaussian (ADoG) based feature point, which estimates the position based on one type of odometry information selected between the odometry information calculated by visual odometry, based on stereo imaging, and the odometry information calculated by internal odometry, based on inertial information, and a method thereof.

Further, the present invention has been made in an effort to further provide an apparatus for recognizing the position of a mobile robot by updating the key frames of the mobile robot using an ADoG-based feature point, which extracts a predetermined number of horizontal lines from a stereo image to perform dense stereo alignment along the extracted horizontal lines to obtain distance information to an obstacle as a result, and a method thereof.

However, the object of the present invention is not limited to the above description, and other objects which have not been mentioned above will be more apparent to those skilled in the art from a reading of the following description.

According to an aspect of the present invention, an apparatus for updating the key frames of a mobile robot may include a key frame initializing unit which initializes the seeds that constitute a key frame in the first position of the mobile robot; and a key frame updating unit which uses the key frames generated upon change of position of the mobile robot to determine the present position, and projects the seeds of the key frame to determine the parallax value of the projection, which is then used in order to update the key frame regarding the current position It is preferable that the seeds which constitute the key frame include the image coordinates, disparity, depth, variance of the disparity, variance of the depth, pixel value, and gradient direction.

Preferably, the key frame initializing unit may perform stereo matching on an edge extracted from a photographed stereo image to obtain the parallax values, which are then used to initialize the depth value of the seed for which the coordinates are restored using the parallax value to be the depth value of a seed which falls within a predetermined distance.

Preferably, the key frame initializing unit may set the seeds with restored coordinates as a first candidate group and set seeds which have a gradient magnitude which is greater than a threshold value as a second candidate group, and then initialize the parallax value of the first candidate group to be the parallax value of the applicable seed when the distance between the adjacent first candidate group is within a preconfigured distance.

Preferably, the key frame updating unit determines the current position and uses the applicable image and a key frame to set the search range within the image, after which the the parallax value of the seeds projected within the search range are used to set the matching points, which are finally used as a basis for updating the parallax value of the seeds within the key frame related to the current position.

Preferably, the key frame updating unit may set the point having the highest similarity between two corresponding points within the set search range as the matching point.

The apparatus for updating the map of a mobile robot in the present invention may further include a key frame generating unit, which generates a key frame upon movement of the mobile robot in accordance with preconfigured key frame generating conditions.

Preferably, the key frame generating unit may check whether the predetermined key frame generating conditions are satisfied, and when the key frame generating condition are found to be satisfied as as a result of the check, may generate a key frame using the parallax values which are obtained by stereo matching.

Preferably, the key frame generating unit may generate a key frame using the parallax values obtained by performing stereo matching and a portion of the seeds of the key frame.

Preferably, the key frame generating unit may check a loop closure for the generated key frame to set the key frames which constitutes the key frame set.

According to another aspect of the present invention, a method of updating a map of a mobile robot may include: the step of initializing seeds which constitute the key frame in the starting position of a mobile robot; and a step in which the key frames generated according to the movement of the position of the mobile robot are used to determine the current location, and the seeds from said key frames are projected in order to use the disparity of the seeds to update the key frame relating to the current position.

According to another aspect of the present invention, a method of updating a key frame of a mobile robot may include: the step of initializing seeds which constitute the key frame in the starting position of a mobile robot; and the step of projecting seeds in the initialized key frame onto a first image photographed in the first position to obtain the coordinates corresponding to each of the seeds, which are used to project the seeds onto a second image photographed in a second position after movement of the mobile robot to update the seeds of the key frame as a result of the projection.

Preferably, the seeds which constitute the key frame may include an image coordinate, a disparity, a depth, a variance of the disparity, a variance of the depth, a pixel value, and a gradient direction.

Preferably, in the initialization step, stereo matching may be performed on an edge extracted from a photographed stereo image to obtain the parallax value, which is used to initialize the parallax value of seeds for which the deviation falls within a preconfigured distance of the parallax value s of the seeds whose coordinates were restored. parallax value Preferably, in the initialization step above, the seeds with restored coordinates may be set as a first candidate group, and seeds having a magnitude of the gradient which is greater than the threshold value may be set as a second candidate group, and then the parallax value of the first candidate group may be initialized to be the parallax value of the seed when the distance between the adjacent first candidate group is within a preconfigured distance parallax value Preferably, in the updating step, when the current location is determined, the applicable image and key frames are utilized to set the search range within the image, after which the parallax value of the seeds projected within the set search range are used to determine the matching points, which are finally used as a basis for updating the parallax value of the seeds which constitute the key frame relating to the current position.

Preferably, in the updating step, the point having the highest similarity between two corresponding points within the set search range may be set as the matching point.

The method of updating the map of a mobile robot in the present invention may further include a step for generating a key frame upon movement of the mobile robot, according to predetermined key frame generating conditions.

Preferably, in the generation step, it may be checked whether the predetermined key frame generating conditions are satisfied, and a key frame may be generated using a parallax value which is obtained by stereo matching when the key frame generating conditions are found to be satisfied as a result of the checking.

Preferably, in the generation step, a key frame may be generated using a parallax value obtained by performing stereo matching and a portion of the seeds of the key frame.

Preferably, in the generation step, loop closure for the generated key frame may be checked to set the key frames which constitute the key frame set.

According to the present invention, when key frames which are generated upon movement in the position of the mobile robot are used to determine the current position, seeds in the key frames are projected, and the parallax value deviations of the projected seeds are used to update the key frame related to the current position, thereby improving the accuracy of the position recognition.

According to the present invention, seeds which constitute an initialized key frame are projected using a first image photographed in a first position to obtain the three-dimensional coordinates of each seed, and the obtained three-dimensional coordinates are projected onto a second image photographed in a second position after movement to update the seeds of the key frame as a result of the projection, thereby improving the accuracy of the position recognition.

According to the present invention, when key frames which are generated upon movement in the position of the mobile robot are used to determine the current position, seeds in the key frames are projected, and the deviation of the parallax value of the projected seeds are used to update the key frame related to the current position, thereby improving the accuracy of the position recognition.

Further, according to the present invention, the position is estimated based on one type of odometry information selected from between the odometry information calculated with stereo odometry, based on stereo imaging, and the odometry information calculated through internal odometry, based on inertial information, thereby reducing the positional error incurred when the mobile robot is tilted or slides.

Further, according to the present invention, the problem of vulnerability to a positional error incurred when the mobile robot is tilted or slides is solved, so that the position may be stably recognized.

Further, according to the present invention, a preconfigured number of horizontal lines is extracted from a stereo image to perform dense stereo alignment along the extracted horizontal lines, which results in obtaining information on the distance to an obstacle, thereby obtaining information on the distance to obstacles without a requirement for attaching an expensive dedicated sensor for measuring distance.

The foregoing summary is illustrative only, and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating an apparatus of recognizing the position of a mobile robot, according to an exemplary embodiment of the present invention.

FIG. 2 is a view illustrating a region of interest of a wide angle camera, according to an exemplary embodiment of the present invention.

FIGS. 3A, 3B and 3C are views illustrating the space recognition process, according to an exemplary embodiment of the present invention.

FIG. 4 is a view illustrating the stereo matching principle, according to an exemplary embodiment of the present invention.

FIG. 5 is a view illustrating uncertainty of a three-dimensional point, according to an exemplary embodiment of the present invention.

FIGS. 6A, 6B, 6C and 6D are views illustrating three-dimensional information of an edge, according to an exemplary embodiment of the present invention.

FIG. 7 is a view illustrating a detailed configuration of the position recognition unit, according to an exemplary embodiment of the present invention.

FIG. 8 is a view illustrating the key frame initialization process, according to an exemplary embodiment of the present invention.

FIG. 9 is a view illustrating the key frame generation process, according to an exemplary embodiment of the present invention.

FIG. 10 is a view illustrating the key frame update process, according to an exemplary embodiment of the present invention.

FIG. 11 is a view illustrating the search range setting principle using the deviation of parallax values.

FIGS. 12A, 12B and 12C are views illustrating the obstacle sensing process, according to an exemplary embodiment of the present invention.

FIG. 13 is a view illustrating the method of position recognition of a mobile robot, according to an exemplary embodiment of the present invention.

It should be understood that the appended drawings are not necessarily to scale, and present a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several drawings of the figures.

DETAILED DESCRIPTION

Hereinafter, an apparatus of updating a key frame of a mobile robot and a method thereof, according to an exemplary embodiment of the present invention, will be described with reference to the accompanying drawings. The detailed explanation provided herein will be centered on parts which are required to understand the operation and effects of the present invention.

In the description of components of an exemplary embodiment, a component having the same name may be denoted by a different reference numeral in some drawings, but may also be denoted by the same reference numeral in other different drawings. However, even in this case, it does not mean that the applicable component has different functions depending on the exemplary embodiment or that the components have the same function in the different exemplary embodiments, but rather the function of each component shall be determined based on the description of the components in the corresponding exemplary embodiment.

According to the present invention, a new method is provided in which when the key frames generated upon movement of position of a mobile robot are used to determine a position, the seeds of the key frame are projected, and the parallax value deviation of the projected seeds are used to update the key frame relating to the current location.

Specifically, according to the present invention, a new method is suggested which projects seeds that constitute an initialized key frame using the first image photographed in the first position to obtain the three-dimensional coordinates of each seed, and projects the obtained three-dimensional coordinates onto a second image photographed in a second position to update the seeds of the key frame as a result of the projection.

Further, according to an exemplary embodiment, the position is estimated based on one type of odometry information selected from between the odometry information calculated by visual odometry, based on stereo imaging, and the odometry information calculated by internal odometry, based on inertial information, and the distance information to an obstacle is obtained as a result of extracting a preconfigured number of horizontal lines from a stereo image to perform dense stereo alignment along the extracted horizontal lines.

FIG. 1 is a view illustrating an apparatus of recognizing a position, according to an exemplary embodiment of the present invention.

As illustrated in FIG. 1, the mobile robot position recognizing apparatus, according to an exemplary embodiment of the present invention, may include a camera 110, an inertial measurement unit (IMU) 120, a position recognizing unit 130, an obstacle sensing unit 140, a map creating unit 150, and a database (DB) 160.

Two cameras 110 may be equipped in order to obtain a pair of stereo images, that is, a left image and a right image. Here, two cameras means that two different lenses are used to obtain an image from two viewing angles. Further, the case in which two lenses are provided in one image capturing device to obtain two images is also include within the meaning. In this case, the camera 110 may be mounted to have a predetermined region of interest. Here, the region of interest may be the region which is captured using the camera 110 provided with the mobile robot.

The camera 110 may preferably be a wide angle camera. A wide angle camera is a camera which takes images using a wide angle lens having an angle of view which is wider than that of a general camera lens. It is preferable to use a wide angle camera for the mobile robot to obtain a broader image of the surroundings. For example, the wide angle camera may be a camera using a fish eye lens. Here, in the wide angle camera, the angle of view of the wide angle lens may be 60 to 270 degrees, for example. In the wide angle camera, according to the exemplary embodiment of the present invention, the angle of view is not limited to the range of the angle of view in the above-described example, and cameras using lenses having various ranges of angles of view may also be used.

FIG. 2 is a view illustrating a region of interest of a wide angle camera, according to an exemplary embodiment of the present invention.

As illustrated in FIG. 2, according to the exemplary embodiment of the present invention, unlike existing mobile robots in which the camera is directed either toward the ceiling or the front side, the two cameras 110 mounted on the mobile robot 10 in the present invention employ wide angle lenses which can see both the ceiling and the front side.

Therefore, in the mobile robot, both the ceiling and the front side may be set as regions of interest (ROI).

For example, the camera may take images of regions in both a horizontal direction and a vertical direction using the wide angle lens.

According to the exemplary embodiment of the present invention, both the ceiling and the front side are set as the regions of interest using the camera 110 mounted as described above, so that the feature points may be easily secured. Further, the position may now be recognized even in places where it is difficult to find feature points, and obstacles located at the front side of the robot may also now be recognized.

The IMU 120 measures inertial information of the mobile robot, for example, information such as the position, pose, and the like.

The position recognizing unit 130 receives stereo image input from the camera 110 and, whenever the mobile robot moves a predetermined distance, it recognizes a given space based on the received stereo image input.

FIG. 3 is a view illustrating the space recognition process, according to an exemplary embodiment of the present invention.

As illustrated in FIG. 3, the position recognizing unit 130 recognizes the given space whenever the mobile robot moves a predetermined distance, or whenever a new key frame is generated, and creates a database thereof.

The position recognizing unit 130 may reduce the received stereo image to be of a preconfigured size for blurring. Here, it is preferable that the preconfigured size may be one eighth the size of the received stereo image. Referring to FIG. 3, the position recognizing unit 130 reduces the received stereo image (a) and generates a blurred image (b).

The position recognizing unit 130 encodes the blurred stereo image using a binary robust independent elementary features (BRIEF) binary descriptor to generate binary data as a result of the encoding. Here, the BRIEF binary descriptor may be encoded using the method introduced in {BRIEF}: Computing a Local Binary Descriptor Very Fast, M. Calonder, V. Lepetit, M. Ozuysal, T. Trzcinski, C. Strecha, and P. Fua IEEE Transactions on Pattern Analysis and Machine Intelligence 2012. Here, the binary data may be generated to be 32 bytes, for example. FIG. 3C is a reference view illustrating the BRIEF binary descriptor.

The position recognizing unit 130 compares the binary data so generated with the data indicating the absolute position of the mobile robot in the previously stored key frame, and as a result of the comparison, may recognize the current position using the absolute position when the absolute position falls within a predetermined range.

The reason why the BRIEF binary descriptor is used to recognize a space in the exemplary embodiment of the present invention is because the calculation speed is much faster than that of established descriptors which are used in the related art, such as SIFT or SURF.

The position recognizing unit 130 receives stereo image input from the camera 110 to obtain the first type of odometry information through visual odometry based on the input stereo image, and receives inertial information from the IMU 120 to obtain the second type of odometry information through internal odometry based on the input inertia information. The odometry information to be obtained by the present invention includes a movement distance and a movement angle. Here, the movement angle refers to an angle with respect to a predetermined direction.

In this case, the position recognizing unit 130 extracts a feature point from the stereo image to trace the extracted feature point, and then uses the traced feature point to obtain the odometry information. The position recognizing unit 130 uses one of the pair of obtained stereo images, generally the left stereo image.

Generally, the feature point which is extracted during the preprocessing process is a corner. However, it is impossible to obtain a sufficient amount of feature points in regions where there is no texture, such as in a hallway or a large office space.

In order to solve the above-mentioned problem, the position recognizing unit 130 performs stereo matching for the edges. That is, the position recognizing unit 130 extracts an edge from the stereo image and performs sparse stereo matching on the extracted edge in order to obtain a parallax value as a result of the sparse stereo matching. Here, sparse stereo matching is a concept which is distinguished from dense stereo matching. Sparse stereo matching is a matching method which focuses more on roughly and quickly matching stereo images, rather than calculating exact matching results. Therefore, various methods of the related art for adjusting the matching interval or adjusting the search range for the matching may be used.

The reason for using this method is that parallax value while it is more effective to perform stereo matching on the entire imaged region in order to obtain as many parallax values as possible, it is more effective to perform stereo matching on the edges to achieve real-time results and a low false positive rate (FPR).

Here, the position recognizing unit 130 extracts edges from the stereo images using various available methods of the related art. However, in the exemplary embodiment of the present invention, the edges may be extracted using approximated difference of Gaussian (ADoG) or a gradient.

First, a method of extracting an edge using a gradient will be described.

The position recognizing unit 130 obtains gradients in a first axis direction and a second axis direction from each pixel of the received stereo image input and extracts the edges based on the gradients in the direction of the first axis and the direction of the second axis.

The first axis and the second axis may be different axes which are orthogonal to each other in the coordinate system of the stereo image plane. Preferably, the first axis and the second axis may be the x-axis and y-axis of an orthogonal coordinate system formed by the x-axis and the y-axis. Hereinafter, the operation of the position recognizing unit 130 employing the x-axis and the y-axis as the first axis and the second axis will be described. Hereinafter, the operation of the position recognizing unit 130 which has been described with reference to the x-axis and the y-axis may also be applied to the first axis and the second axis in the same way.

Next, the position recognizing unit 130 calculates the magnitude ($I_m$) of the gradient using gradients $I_x$ and $I_y$ in the x-axis direction and the y-axis direction, respectively. The magnitude $I_m$ may be calculated using the following Equation:

$$I_m = (I_x^2 + I_y^2)^{1/2}.$$

Next, the position recognizing unit 130 calculates an angle ($I_\theta$) of the gradient using gradients $I_x$ and $I_y$ in the x-axis direction and the y-axis direction, respectively. The angle $I_\theta$ may be calculated by the following Equation: $I_\theta = a \tan 2(I_x, I_y)$. Here, a tan 2(y,x) is an arctangent calculating function having two input variables, and for example, may be calculated using the following equation:

$$\text{atan2}(y, x) = \begin{cases} \arctan\frac{y}{x} & x > 0 \\ \arctan\frac{y}{x} + \pi & y \geq 0, x < 0 \\ \arctan\frac{y}{x} - \pi & y < 0, x < 0 \\ +\frac{\pi}{2} & y > 0, x = 0 \\ -\frac{\pi}{2} & y < 0, x = 0 \\ \text{underfined} & y = 0, x = 0 \end{cases}$$

Next, the position recognizing unit 130 finally extracts the image of an edge through a non-maximal suppression (NMS) process based on the calculated magnitude of the gradient ($I_m$) and the calculated angle of the gradient ($I_\theta$) of each pixel.

That is, the position recognizing unit 130 selects the pixel having the largest gradient magnitude ($I_m$) from among adjacent pixels having the same angle with respect to the angle of the gradient ($I_\theta$) as the pixel with the maximal value (maxima).

This process is applied to all pixels to extract an edge formed by one line.

Thereafter, the position recognizing unit 130 extends the region to a predetermined number of pixels which most closely neighbor each pixel located on the line which forms the edge, and may select a pixel having a size which is equal to or greater than a predetermined threshold value in the extended region as an edge.

For example, the position recognizing unit 130 extends the region to two pixels which are the most adjacent to the applicable pixel and selects all pixels having a size which is equal to or larger than the predetermined threshold value from among pixels in the extended region as belonging to the edge.

This process is applied to all pixels to extract a final edge image, which is formed by a plurality of lines extended from the edge formed by one line through NMS (Non-Maximal Suppression).

Here, the NMS process may use, for example, the non-maximal suppression technique introduced in "Canny, J., A Computational Approach To Edge Detection, IEEE Trans. Pattern Analysis and Machine Intelligence, 8(6):679 to 698, 1986." or may also use other various types of non-maximal suppression techniques.

Next, a method of extracting an edge using an approximated difference of Gaussian (ADoG) will be described.

The present invention suggests a new method in which an integral image is obtained from an original image, after which a box smoothing process is performed on the integral image to obtain a box smoothed image as a result of the box smoothing, and the original image is then extracted from the obtained box smoothing image to finally extract an edge image. In the present invention, the method of extracting an edge by the box smoothing process is referred to as an approximated difference of Gaussian (ADoG).

Here, the position recognizing unit 130 performs a smoothing process on the received stereo image to obtain a smoothed image as a result of the smoothing. The position recognizing unit 130 then compares the smoothed image and the original stereo image to extract an edge, and may estimate the current position of the mobile robot based on the extracted edge.

Here, the position recognizing unit 130 obtains an integral image from the stereo image, performs a box smoothing process on the obtained integral image to calculate a box smoothed image as a result of the box smoothing process, and compares the calculated box smoothing image and the original stereo image so that the edge may be extracted as a result of the comparison.

To this end, the position recognizing unit 130 may include an integral image obtaining unit, which obtains an integral image from the stereo image; a box smoothing image calculating unit, which performs a box smoothing process on the obtained integral image to calculate a box smoothed image as a result of the box smoothing process; and an edge extracting unit, which compares the calculated box smoothed image with the original stereo image to extract the edge as a result of the comparison. The position recognizing unit may further include a position estimating unit.

The integral image obtaining unit of the position recognizing unit 130, according to the exemplary embodiment of the present invention, may obtain an integral image "IntegImage" from the stereo image "orgImage" by the following Equation:

$$\text{IntegImage}(x, y) = \sum_{y'=0}^{y} \sum_{x'=0}^{x} \text{orgImage}(x', y')$$

Here, (x, y) indicates a coordinate of the integral image and (x',y') indicates a coordinate of the stereo image.

Next, the smoothing image calculating unit of the position recognizing unit 130 performs a box blurring process or a box smoothing process on the obtained integral image to calculate a box smoothed image as a result of the box smoothing In this case, the box smoothing may be considered as a preprocessing process for removing the noise or extracting contour information, similarly to Gaussian smoothing.

In the present invention, the box smoothing process has been described as an example, but the present invention is not limited thereto and various other smoothing processing techniques, such as Gaussian smoothing, may also be applied.

Next, the edge extracting unit of the position recognizing unit 130 extracts an edge image "$I_{edge}$" by subtracting the original image, that is, the stereo image "$I_{source}$" from the box smoothing image "$I_{box\_blur}$," which may be calculated by the following equation:

$$I_{edge} = I_{box\_blur} - I_{source}.$$

The final edge image may be extracted through this process of integration, smoothing, and subtraction.

Next, a process by which the position recognizing unit 130 performs stereo matching using the above-described extracted edge will be described.

FIG. 4 is a view illustrating the stereo matching principle, according to an exemplary embodiment of the present invention.

As illustrated in FIG. 4, edges are obtained from each the left image and the right image, and then the matching is performed along an epipolar line. In this case, all edges in the image become candidate points, and the final candidate point is selected from among candidates according to the gradient direction.

For example, in a reference of the left image, candidates 0 and 1 in the right image may be determined as candidate points in consideration of the maximum search range. However, in this case, since the gradient direction of candidate 1 is different from the reference, candidate 1 is excluded from being the final candidate point.

In this case, the stereo matching may be performed through n×n block matching, or by extracting n pixels from along the epipolar line.

FIG. 5 is a view illustrating the uncertainty of a three-dimensional point, according to an exemplary embodiment of the present invention.

As illustrated in FIG. 5, the position recognizing unit 130 sets the uncertainty or variance σ according to the parallax value obtained by a result of stereo matching and stores the uncertainty and variance σ in the DB. In the case of wide angle cameras, the resolution is low because the focal length is very short, so that the reliability of the obtained parallax value also falls. Therefore, an update is performed later.

The uncertainty of the three-dimensional points obtained using two cameras is represented by Equation 1.

$$\Sigma = \begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix}$$

$$= \begin{pmatrix} \frac{b^2 \sigma_c^2}{d^2} + \frac{b^2(c-c_0)\sigma_d^2}{d^4} & \frac{(c-c_0)b^2 \sigma_d^2 (r-r_0)}{d^4} & \frac{(c-c_0)b^2 \sigma_d^2 f}{d^4} \\ \frac{(c-c_0)b^2 \sigma_d^2 (r-r_0)}{d^4} & \frac{b^2 \sigma_r^2}{d^2} + \frac{b^2(r-r_0)\sigma_d^2}{d^4} & \frac{(r-r_0)b^2 \sigma_d^2 f}{d^4} \\ \frac{(c-c_0)b^2 \sigma_d^2 f}{d^4} & \frac{(r-r_0)b^2 \sigma_d^2 f}{d^4} & \frac{f^2 b^2 \sigma_d^2}{d^4} \end{pmatrix}$$

Here, $$\begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix}$$

indicates an uncertainty covariance ellipsoid, b indicates the distance between the cameras, x, y, and z indicate the coordinate system of the left imaging camera, x', y', and z' indicate the coordinate system of the right imaging camera, (c, r) and (c', r') indicate the coordinates of matching pixels in the left camera and the right camera, f and f' indicate the focal distances of the left camera and the right camera, $\sigma_r$ and $\sigma_c$ represent the uncertainty when the feature point is extracted, as axes of the coordinate system, and $r_0$ and $c_0$ represent the optical axis of the camera as a camera coordinate system. Further, d is the difference generated when the feature point is projected to the left side and the right side, and is generally referred to as disparity. $\sigma_d$ represents the uncertainty of the measured parallax value.

At a time when it is determined that the mobile robot has moved a predetermined distance, pixels which are stored in the key frame are projected onto the current image to find the most similar pixel, with which the parallax value is updated. The update may be performed by applying a general Bayesian rule.

Here, the position recognizing unit 130 performs stereo matching between the stereo images using the edge extracted from the stereo image to calculate the disparity or the parallax value of a pixel included in the stereo image, and then estimates the current position of the mobile robot using the calculated disparity or parallax values. That is, the stereo matching between stereo images is performed on the pixels which correspond to the edge extracted from the stereo image in order to calculate the disparity or the parallax value, and the current position of the mobile robot is then estimated using the disparity or the parallax value, the optical axis information of the camera, the focal distance information, and the information of the distance between the stereo cameras. That is, when the disparity or the parallax value of a specific pixel of the stereo image and the specification information (optical axis, focal distance, distance between cameras) of the camera which obtained the stereo images are known, the three-dimensional coordinate of the pixel may be restored, and the position of the mobile robot may be figured out relatively through the position of the three-dimensional coordinate in the pixels included in the stereo image.

For example, when the optical axes u0 and v0 are known, the focal distance f and the distance between cameras (b) are also known, and the disparity d is determined through stereo matching, the restored three-dimensional coordinates (x, y, z) are $$\left( \frac{b(u-u0)}{d}, \frac{b(v-v0)}{d}, \frac{fb}{d} \right).$$

U and v indicate the coordinates of a pixel in the stereo image.

Further, as the method of figuring out the position of the object from which the stereo image is obtained using the parallax value of the stereo image, various existing techniques of the related art may be used.

Here, a seed may be set for a pixel selected from the edge of the image. Further, a seed may be set for pixels for which the three-dimensional coordinates are restored as described above.

Here, the key frame may be a set of seeds indicating pixels selected from the edge of the stereo image, which contain periodically measured information regarding the state of the mobile robot, and the relationship between the key frame, K, and the seed, s, is represented by Equation 2.

$$K = \{s_0, s_1, \ldots, s_n\} \quad \text{[Equation 2]}$$

Here, the seeds (s) may include an image coordinate, a disparity or a depth, a variance of the disparity or a variance of the depth, a pixel value or intensity, a gradient direction, or a gradient angle.

In this case, the gradient direction or the gradient angle $I_\theta$ is obtained through Equation 3.

$$I_\theta = a \tan 2(I_y, I_x) \quad \text{[Equation 3]}$$

Here, $I_x$ and $I_y$ are gradients in the direction of the first axis and the second axis, respectively, for example, indicating gradients in the x-axis and y-axis directions, as described above.

In this case, while the mobile robot is in motion, erroneous information is input due to various variables, particularly, moving obstacles or blocking, thus there may exist outliers among the parallax values obtained based on erroneous information.

In order to solve the above-mentioned problem, when the obtained parallax value is within 1Σ, the variable "no_success" is increased by one, and when the obtained parallax value is larger than 1Σ, the variable "no_failure" is increased by one. Thereafter, only when the reliability no_success/(no_success+no_failure) is larger than a specific value is the parallax value used to recognize the position.

The Bayesian rule which is used to update the parallax value is represented by Equation 4.

$$\mu = [\sigma_{z_2}^2/(\sigma_{z_1}^2+\sigma_{z_2}^2)]\mu_{z_1} + [\sigma_{z_1}^2/(\sigma_{z_1}^2+\sigma_{z_2}^2)]\mu_{z_2}, 1/\sigma^2 = (1/\sigma_{z_1}^2) + (1/\sigma_{z_2}^2)$$ [Equation 4]

μ is the average of parallax values, $\mu_{z_1}$ is the average of the previously obtained parallax values, $\mu_{z_2}$ is the average of the currently measured parallax values, σ is the uncertainty of μ, $\sigma_{z_1}$ is the uncertainty of $\mu_{z_1}$, and $\sigma_{z_2}$ is the uncertainty of $\mu_{z_2}$. Here, although the update process of the parallax value z has been described, the x and y values vary depending on z. Therefore, x, y, and z are all updated so that the position may be determined, and the updated x, y, and z are used so that the position of the camera may also be determined inversely.

FIG. 6 is a view illustrating the three-dimensional information of an edge, according to an exemplary embodiment of the present invention. FIG. 6A is an image representing a parallax value which is projected to the left imaging camera, FIG. 6B is an image representing a parallax value which is projected to the right imaging camera, FIG. 6C is an image representing a parallax value obtained through the updating process, and FIG. 6D is an image representing projection to a matching point and a parallax value.

As illustrated in FIG. 6, it is understood that when the parallax value is repeatedly updated, the three-dimensional information on the edge may be consistently obtained.

The information from the IMU is very important in situations where it is difficult to recognize the environment through the camera. However, in low-priced IMUs, the bias varies significantly, or estimation of the bias is very difficult. In order to solve said problem, the bias is obtained by stopping the robot for a moment and taking an average. In this case, however, there are disadvantages in that the user may think that the mobile robot is unintelligent, and the working speed is also lowered.

In order to solve the above-mentioned problems, the position recognizing unit 130 updates the bias even during movement.

It is assumed that $\theta_g$ is the angular velocity obtained by a gyro sensor and $\theta_c$ is the angular velocity obtained by wide angle stereo vision. Error may be incurred between these angular velocities due to bias while the mobile robot is in motion. The error $\theta_e$ may be defined by Equation 5.

$$\theta_e = \theta_g - \theta_c$$ [Equation 5]

In this case, $\theta_e$ may be a bias. When speedy rotation or disturbance occurs, the bias is updated by applying the Bayesian rule as represented by Equation 6.

$$\text{If, } |\theta| < \text{threshold}_{moving}, \mu_n = \theta_e, \sigma^2 = 1 \text{ deg/sec} \times 0.1 \text{ deg/sec}$$ [Equation 6]

$v_n$ indicates the error of the bias and σ indicates the uncertainty of $\mu_n$. When the mobile robot may stop during movement, the bias is updated as represented by Equation 7.

$$\text{If, } |\theta| < \text{threshold}_{stop}, \mu_n = \theta_e, \sigma^2 = 0.1 \text{ deg/sec} \times 0.1 \text{ deg/sec}$$ [Equation 7]

Since the bias is corrected in real time by the above-described updating process, even when the camera cannot be used momentarily, the odometry information obtained through use of the IMU may be maintained at a predetermined level of accuracy by using the optimal bias.

The position recognizing unit 130 selects either the first type of odometry information or the second type of odometry information and uses the selected information as a basis for estimating the current state information of the mobile robot, for example, the pose or position. That is, the position recognizing unit 130 accumulates the odometry information which is periodically measured while moving from a reference point, specifically, the movement distance and the movement angle are obtained. The information so obtained is used to predict the relative position and angle from the movement point calculated from the accumulation results, that is, using the reference point at which movement starts.

The position recognizing unit 130 may estimate the current position using at least one adjacent key frame from among the previously stored key frame set, based on the movement point predicted as described above. That is, the position recognizing unit 130 estimates the current position using at least one key frame which is adjacent to the predicted movement point.

FIG. 7 is a view illustrating a detailed configuration of the position recognizing unit, according to an exemplary embodiment of the present invention.

As illustrated in FIG. 7, the position recognizing unit 130, according to the exemplary embodiment of the present invention, includes a key frame initializing unit 131, a key frame generating unit 132, and a key frame updating unit 133.

As the position moves, the key frame initializing unit 131 may generate a new key frame. In this case, when the error between the projected images from the key frame and the image taken increases so that the position recognition accuracy is lowered, the key frame generating unit 132 generates a new key frame.

FIG. 9 is a view illustrating the key frame generating process, according to an exemplary embodiment of the present invention.

As illustrated in FIG. 9, when the mobile robot moves in step S910, the key frame generating unit 132 checks whether the preconfigured key frame generation conditions are satisfied in the position in step S920.

In this case, the preconfigured key frame generating conditions include: 1) the case in which the distance between the position where the key frame is generated and the camera is t or larger, 2) the case in which the relative angle between the position where the key frame is generated and the camera is a or larger, and 3) the case when k or more seeds among the seeds included in the key frame cannot be used.

For example, in a general case, the values of t=0.5 m, a=15 degree, and k=60% may be used, and when the mobile robot moves on a two-dimensional plane, the values of t=0.7 m, a=20 degree, and k=50% may be employed.

Even though the variables t, a, and k in the key frame generating conditions are described as specific values in the examples above, the variables are not limited thereto and may be changed if necessary.

Next, when the key frame generating conditions are found to be satisfied as a result of the checking, the key frame generating unit 132 may generate a new key frame in step S930. That is, the key frame generating unit 132 uses the parallax value obtained by performing stereo matching and a portion of the seeds of the key frame to generate a new key frame.

In this case, when the key frame is updated, the key frame generating unit 132 employs a seed which is used a predetermined number of times, or a seed for which the variance of parallax values is within a predetermined range, from among the seeds in the key frame.

Next, the key frame generating unit 132 checks a loop closure for the generated new key frame in step S940, and as a result, generates a candidate key frame of the key frame set in step S950.

For example, the key frame generating unit 132 obtains a relative pose from between the images projected by the camera and an existing key frame by using a direct tracking technique on an existing key frame which falls within a distance $t_c$ from the camera and has a relative angle within $a_c$, and when the cost for the obtained relative pose is $c_c$ or lower, sets the new key frame as a candidate frame.

As another example, the key frame generating unit 132 primarily checks the qualification of the existing key frame which is within a distance $3t_c$ from the camera and has a relative angle within $3a_c$ using a scene descriptor, and secondarily obtains a relative posture between the images projected by the camera and the existing key frame using a direct tracking technique, and when the cost for the obtained relative posture is $c_c$ or lower, sets the new key frame as a candidate frame.

Thereafter, the key frame generating unit 132 provides the set candidate frame to the map creating unit so that the map creating unit may reconstitute a pose graph to maintain consistency of the map.

When the key frame updating unit 133 determines the current location, the key frame may be updated. In this case, the key frame update unit 133 updates the parallax values of the seeds.

When the key frame is generated in the first position, the key frame initializing unit 131 may initialize seeds which constitute the generated key frame. In this case, the key frame initializing unit 131 initializes the parallax value of the seeds which constitute the key frame. Here, when the parallax value is initialized, a depth value which is calculated in the first position is set.

FIG. 8 is a view illustrating the key frame initializing process, according to an exemplary embodiment of the present invention.

As illustrated in FIG. 8, the key frame initializing unit 131 performs stereo matching on the edge extracted from the stereo image taken at the starting position to obtain the disparity in step S810, and then restores the three-dimensional coordinates (x, y, z) using the obtained disparity in step S820. The restored three-dimensional coordinates are represented by Equation 8.

$$x = \frac{b(u - u0)}{d}, \quad y = \frac{b(v - v0)}{d}, \quad z = \frac{fb}{d} \quad \text{[Equation 8]}$$

Here, u0 and v0 indicate optical axes, f indicates the focal distance, b indicates the distance between cameras, and d indicates the disparity. u and v indicate the coordinates of a pixel in the stereo image.

Next, the key frame initializing unit 131 sets pixels or seeds of the restored coordinates as a first candidate group in step S830 and then sets and stores pixels, which are not the first candidate group, that have a magnitude of the gradient which is equal to or greater than a threshold value as a second candidate group in step S832.

The second candidate group may be a first candidate group of the key frame generated in a subsequent position.

Next, the key frame initializing unit 131 may initialize the parallax value of the seeds based on the first candidate group in step S840. That is, when there is the first candidate group surrounding the applicable seed and the distance therebetween is within a preconfigured distance, for example, within a distance corresponding to two pixels, the key frame initializing unit 131 initializes the parallax value using the parallax value of the first candidate set. Otherwise, the parallax value is set to zero.

When a wide angle camera is used to obtain the stereo image, as described above with reference to FIG. 4, since a focal length thereof is too short so that resolution is low and thus the reliability is lowered. Therefore, the parallax value which is initially generated as described above needs to be updated thereafter.

When the key frame is generated in the first position, seeds included in the generated key frame are initialized, the key frame moves to a second position, and the second position is checked, the key frame updating unit 133 updates the key frame in the second position.

In this case, the key frame updating unit 133 updates the parallax value of the seeds.

FIG. 10 is a view illustrating a key frame updating process, according to an exemplary embodiment of the present invention, and FIG. 11 is a view illustrating the search range setting principle using the deviation of a parallax value.

As illustrated in FIG. 10, the key frame updating unit 133 sets the search range within the image to update the parallax value based on the initialized three-dimensional coordinates of the seed projected in the first position in step S1010.

With reference to FIG. 11, when it is assumed that the initialized three-dimensional coordinate of the projected seed obtained by projecting at least one of the seeds which constitute the key frame in a first position, $T_0$, is $P_i$ the initialized three-dimensional coordinate $P_i$ has the uncertainty or variance of δ.

That is, the initialized three-dimensional coordinate $P_i$ may be present within a variance range of $P_i-δ$ to $P_i+δ$.

All the three-dimensional coordinates or the seeds with the three-dimensional coordinates within the variance range are projected onto a photographed image by being moved to a second position, $T_1$, and the search range in the photographed image may be set as a result of the projection. The seeds within the variance range are the same seed but have different parallax values.

The search range may be determined on an epipolar line formed on the image photographed in the second position based on Epipolar geometry.

Next, the key frame updating unit 133 compares pixels around points on the epipolar line and pixels around the seed and sets the point found to have the highest similarity as a result of the comparison as a matching point in step S1020. For example, the similarity between two images is calculated using the sum of squared differences (SSD).

Next, the key frame updating unit 133 may update the parallax value based on the set matching point in step S1030. In this case, the key frame updating unit 133 updates the parallax value of the seeds using a Bayesian rule.

Next, the key frame updating unit 133 checks whether the variance of the parallax value is within a predetermined threshold value S1040 and when it is found as a result of the checking that the variance falls within the threshold value, the updating of the parallax value may be ended.

In contrast, when the variance is found to exceed the threshold value as a result of the checking, the key frame updating unit 133 repeatedly performs the process of updating the parallax value until the variance of the parallax value falls within the threshold value.

The key frame which has been updated through the above-described process may be used to recognize a position.

The obstacle sensing unit 140 receives stereo image input from the camera 110 and extracts a preconfigured number of horizontal lines from the received stereo image input. Here, the preconfigured number is at least two, and preferably three.

The obstacle sensing unit 140 performs dense stereo matching along the extracted horizontal lines, and as a result, obtains information on the distance to an obstacle.

FIG. 12 is a view illustrating the obstacle sensing process, according to an exemplary embodiment of the present invention.

As illustrated in FIG. 12, the obstacle sensing unit 140 performs highly dense stereo matching based on the received left and right stereo images as illustrated in FIGS. 12A and 12B, and as a result may calculate the parallax value. Here, in the image of FIG. 12C, the parallax value calculated as described above is represented in grayscale. Further, FIG. 12C illustrates a linear region, L, which is used to sense the obstacle.

In this case, since it is impossible for the parallax values for the entire region to be calculated by a mobile robot mounted with a small-sized processor, in the exemplary embodiment of the present invention, parallax values are extracted only from a partial region.

The map creating unit 150 is provided with the current position information estimated by the position recognizing unit 130, reconstructs a pose graph based on the provided position information, and may update the previously stored key frame set based on the reconstructed pose graph. A map may be configured by the set of key frames.

The DB 160 stores the key frame set generated in accordance with movement of the mobile robot, that is, the map.

FIG. 13 is a view illustrating the method of recognizing the position of a mobile robot, according to an exemplary embodiment of the present invention.

As illustrated in FIG. 13, when an apparatus for recognizing the position of the mobile robot (hereinafter referred to as a position recognizing apparatus), according to an exemplary embodiment of the present invention, receives stereo image input from the camera in step S910, it extracts feature points from the input stereo image and continuously traces the extracted feature points by frame in step S920.

Next, the position recognizing apparatus may remove moving objects from the stereo image in step S930.

For example, the position recognizing apparatus compares the current frame and the last n-th frame, and as a result of the comparison removes inconsistent features which may be determined to be moving objects.

Next, the position recognizing apparatus performs visual odometry based on the traced feature points to obtain the first type of odometry information as the result in step S940, and obtains the second type of odometry information through internal odometry, based on inertial information in step S942.

Next, the position recognizing apparatus selects one type of odometry information from between the first odometry information and second odometry information obtained in step S950, and uses the selected odometry information and pose information to predict the state information in step S960.

In this case, the position recognizing apparatus selects the first odometry information when the first odometry information satisfies the predetermined conditions, and selects the second odometry information when the first odometry information does not satisfy the predetermined conditions.

Here, determining whether the predetermined conditions are satisfied refers to determining whether the odometry information, for example, the rate of change of the position information, is within the preconfigured threshold value.

Next, based on the predicted state information, the position recognizing apparatus searches at least one key frame from among the previously stored key frame set in step S970, and may estimate the current position using at least one of the key frames searched in step S980.

That is, the position recognizing apparatus forms a virtual space using the searched key frames and divides the formed virtual space into a plurality of regions. It then projects the seeds in a key frame onto each of the plurality of divided regions to calculate the edge size corresponding to the coordinates of the projected seeds, and selects the region having the largest sum of the calculated edge sizes as a position candidate. Finally, it then divides the selected candidate region into a plurality of regions and repeatedly performs the process of selecting position candidates, thereby determining a final position.

As another example, the position recognizing apparatus projects each seed in a selected key frame onto an image to calculate a cost indicating the sum of edge sizes as a result of the projection, and a status parameter indicating the rotation and updated movement of the camera along the direction in which the calculated cost is increased is used to estimate the position having the highest cost as the current position, thereby calculating a final position.

That is, the position recognizing apparatus repeatedly performs the processes of projecting the seeds in a searched key frame onto an image to calculate the intensity difference between the edge in an image and the projected seed as a result of the projection, thereby updating a status parameter indicating rotation and movement of the camera to reduce the calculated intensity difference in order to estimate the position based on the updated status parameter until it is determined that there is no intensity difference.

In this case, the accuracy of the position estimation may be improved as the number of adjacent key frames increases.

The position recognizing apparatus, according to the exemplary embodiment, may be applied to autonomous cleaning robots or service robots. For example, cleaning robots autonomously move in indoor environments or outdoor environments. While running, the cleaning robot meets various obstacles such as walls, guardrails, desks, or furniture, and the autonomous cleaning robot uses its position and the position of obstacles in the cleaning area to determine the driving route, along which it moves. According to the exemplary embodiment, the autonomous cleaning robot includes a stereo camera, specifically, a wide angle stereo camera, as an image capturing unit to obtain external images. Through the external environmental information so-acquired, especially the feature points related to edges, the autonomous cleaning robot is able to estimate its own position, determine the driving route, and thus move.

Specifically, in the case of cleaning robots which autonomously move based on simultaneous localization and map-building (SLAM), the exemplary embodiment may be used for the robot to estimate its own position on the constructed lattice map, to estimate the position of obstacles, to determine a movement route to avoid collision with the obstacles using the estimated position relationships, and to determine an optimal route.

In the exemplary embodiment, the odometry information may be data which is used to estimate the positional change of the mobile robot in accordance with time. For example, the odometry information may be information obtained from a wheel mounted on the mobile robot, or from rotary encoders in a legged joint. The status information, such as a moving distance of the mobile robot or number of rotations of the wheel, may be calculated using the odometry information. Further, the space where the mobile robot is currently located may be understood through the status information, so that the odometry information may be used to determine the key frame during image processing.

The position recognition method, according to the exemplary embodiment of the present invention, may be implemented as computer readable software, and the software may be executed in a processor mounted in an autonomous cleaning robot.

Even though all components of the exemplary embodiment may be combined as one component or their operations may be combined, the present invention is not limited to the exemplary embodiment. In other words, if it is within the scope or purpose of the present invention, one or more of all of the components may be selectively combined for operation. Further, all of the components may be implemented as one independent hardware, but a part or all of the components may be selectively combined for implementation as a computer program which includes a program module that performs a part or all of the functions combined in one or plural hardwares. Further, such a computer program may be stored in a computer readable media such as a USB memory drive, a CD disk, or flash memory to be read and executed by a computer for implementation of the exemplary embodiment of the present invention. The storage media of the computer program may include media such as magnetic recording media, optical recording media, and carrier wave media.

The exemplary embodiments of the present invention which have been described above are examples, and it is obvious to those skilled in the art that various changes or modifications may be made without departing from the spirit and scope of the present invention. Therefore, the exemplary embodiments of the present invention are provided for illustrative purposes only and are not intended to limit the technical spirit of the present invention, and the scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A mobile robot comprising at least one processor and a non-transitory computer-readable medium storing instructions that, when executed by the at least one processor, cause the mobile robot to:
   initialize seeds of a key frame associated with a first position of the mobile robot;
   project the initialized seeds onto an image associated with a second position of the mobile robot to update parallax values of seeds of a key frame associated with the second position of the mobile robot,
   wherein the seeds of the key frames associated with the first and second positions include an image coordinate, a disparity, a depth, a variance of the disparity, a variance of the depth, a pixel value, a gradient direction, or combination thereof.

2. The mobile robot of claim 1, wherein the image is a stereo image and wherein the parallax values include depth information.

3. The mobile robot of claim 1, wherein the instructions, when executed by the at least one processor, further cause the mobile robot to perform stereo matching on an edge extracted from a photographed stereo image to obtain a disparity, and initializes a parallax value of the seed of a coordinate.

4. The mobile robot of claim 1, wherein the instructions, when executed by the at least one processor, further cause the mobile robot to seed in the restored coordinate as a first candidate group and set seeds having a magnitude of the gradient which is larger than a threshold value as a second candidate group, and initialize a parallax value of the first candidate group to be a parallax value of the seed when the distance between adjacent first candidate groups is within a predetermined distance.

5. The mobile robot of claim 1, wherein the instructions, when executed by the at least one processor, further cause the mobile robot to project all coordinates including a coordinate of the projected seed and coordinate within a variance range of the coordinate onto an image photographed in the second position when the moved second position is checked to set a search range as the projected result, set a matching point within the set search area, and update a parallax value of the seeds which constitute the key frame based on the set matching point.

6. The mobile robot of claim 5, wherein the instructions, when executed by the at least one processor, further cause the mobile robot to set a point having the highest similarity between corresponding two points within the set search range as the matching point.

7. The mobile robot of claim 1,
   instructions, when executed by the at least one processor, further cause the mobile robot to generate a key frame in accordance with a predetermined key frame generating condition when the mobile robot moves.

8. The mobile robot of claim 7, wherein the instructions, when executed by the at least one processor, further cause the mobile robot to check whether to satisfy the predetermined key frame generating condition and when the key frame generating condition is satisfied as the checking result, generate a key frame using a parallax value which is obtained by stereo matching.

9. The mobile robot of claim 8, wherein the instructions, when executed by the at least one processor, further cause the mobile robot to generate a key frame using a parallax value obtained by performing stereo matching and using some of seeds of the key frame.

10. The mobile robot of claim 7, wherein the instructions, when executed by the at least one processor, further cause the mobile robot to check a loop closure for the generated key frame to set a key frame which constitutes the key frame set.

11. A method of controlling movement of a mobile robot, the method comprising:
   initializing seeds of a key frame associated with a first position of the mobile robot;

projecting the initialized seeds onto an image associated with a second position of the mobile robot to update parallax values of seeds of a key frame associated with the second position of the mobile robot, wherein the seeds of the key frames associated with the first and second positions include an image coordinate, a disparity, a depth, a variance of the disparity, a variance of the depth, a pixel value, a gradient direction, or combination thereof.

12. The method of claim 11, wherein the image is a stereo image and wherein the parallax values include depth information.

13. The method of claim 11, further comprising performing stereo matching on an edge extracted from a photographed stereo image to obtain a disparity, and initializes a parallax value of the seed of a coordinate.

14. The method of claim 11, further comprising projecting all coordinates including a coordinate of the projected seed and coordinates within a variance range of the coordinate onto an image photographed in the second position when the moved second position is checked to set a search range as the projected result, setting a matching point within the set search area, and updating a parallax value of the seeds which constitute the key frame based on the set matching point.

15. The method of claim 11, further comprising:
generating a key frame in accordance with a predetermined key frame generating condition when the mobile robot moves.

16. The method of claim 15, further comprising checking whether to satisfy the predetermined key frame generating condition, and when the key frame generating condition is satisfied as the checking result, generating a key frame using a parallax value which is obtained by stereo matching.

17. The method of claim 16, further comprising generating a key frame using a parallax value obtained by performing stereo matching and using some of seeds of the key frame.

18. The method of claim 15, further comprising checking a loop closure for the generated key frame to set a key frame which constitutes the key frame set.

19. A mobile robot comprising at least one processor and a non-transitory computer-readable medium storing instructions that, when executed by the at least one processor, cause the mobile robot to:
initialize seeds of a key frame associated with a first position of the mobile robot;
project the initialized seeds onto an image associated with a second position of the mobile robot to update parallax values of seeds of a key frame associated with the second position of the mobile robot,
wherein the key frame initializing unit sets seeds in the restored coordinate as a first candidate group and sets seeds having a magnitude of the gradient which is larger than a threshold value as a second candidate group, and initializes a parallax value of the first candidate group to be a parallax value of the seed when the distance between adjacent first candidate groups is within a predetermined distance.

20. The mobile robot of claim 19, wherein the image is a stereo image and wherein the parallax values include depth information.

21. The mobile robot of claim 19, wherein the seeds of the key frames associated with the first and second positions include an image coordinate, a disparity, a depth, a variance of the disparity, a variance of the depth, a pixel value, and a gradient direction.

22. The mobile robot of claim 19, wherein the instructions, when executed by the at least one processor, further cause the mobile robot to perform stereo matching on an edge extracted from a photographed stereo image to obtain a disparity, and initialize a parallax value of the seed of a coordinate.

23. The mobile robot of claim 19, wherein the instructions, when executed by the at least one processor, further cause the mobile robot to project all coordinates including a coordinate of the projected seed and coordinate within a variance range of the coordinate onto an image photographed in the second position when the moved second position is checked to set a search range as the projected result, set a matching point within the set search area, and update a parallax value of the seeds which constitute the key frame based on the set matching point.

24. The mobile robot of claim 23, wherein the instructions, when executed by the at least one processor, further cause the mobile robot to set a point having the highest similarity between corresponding two points within the set search range as the matching point.

25. The mobile robot of claim 19, wherein the instructions, when executed by the at least one processor, further cause the mobile robot to generate a key frame in accordance with a predetermined key frame generating condition when the mobile robot moves.

26. The mobile robot of claim 25, wherein the instructions, when executed by the at least one processor, further cause the mobile robot to check whether to satisfy the predetermined key frame generating condition and when the key frame generating condition is satisfied as the checking result, generate a key frame using a parallax value which is obtained by stereo matching.

27. The mobile robot of claim 26, wherein the instructions, when executed by the at least one processor, further cause the mobile robot to generate a key frame using a parallax value obtained by performing stereo matching and using some of seeds of the key frame.

28. The mobile robot of claim 25, wherein the instructions, when executed by the at least one processor, further cause the mobile robot to check a loop closure for the generated key frame to set a key frame which constitutes the key frame set.

* * * * *